United States Patent
Weed et al.

(10) Patent No.: US 10,084,511 B2
(45) Date of Patent: Sep. 25, 2018

(54) APPARATUS AND METHOD FOR POWER LINE COMMUNICATION ON A DUAL VOLTAGE VEHICLE

(71) Applicant: Bendix Commercial Vehicle Systems LLC, Elyria, OH (US)

(72) Inventors: Thomas J. Weed, North Ridgeville, OH (US); Daniel P Zula, North Ridgeville, OH (US); Timothy J Frashure, Columbia Station, OH (US); Michael D Tober, Avon, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 332 days.

(21) Appl. No.: 14/884,419

(22) Filed: Oct. 15, 2015

(65) Prior Publication Data
US 2017/0106757 A1  Apr. 20, 2017

(51) Int. Cl.
*H04B 3/54* (2006.01)
*B60L 11/18* (2006.01)

(52) U.S. Cl.
CPC ............ *H04B 3/548* (2013.01); *B60L 11/18* (2013.01); *H04B 2203/547* (2013.01)

(58) Field of Classification Search
CPC ..... H04B 2203/547; H04B 3/548; H04B 3/54
See application file for complete search history.

(56) References Cited

U.S. PATENT DOCUMENTS

| | | | |
|---|---|---|---|
| 5,488,352 A | 1/1996 | Jasper | |
| 6,505,105 B2 | 1/2003 | Allen et al. | |
| 6,833,119 B1 | 12/2004 | Inman et al. | |
| 6,970,772 B2 * | 11/2005 | Radtke | H04B 3/548 |
| | | | 303/122.06 |
| 7,286,044 B2 | 10/2007 | Yanagida et al. | |
| 8,680,976 B2 | 3/2014 | Lesesky | |
| 9,533,635 B2 * | 1/2017 | Nobauer | H04B 3/548 |
| 2004/0189090 A1 | 9/2004 | Yanagida et al. | |
| 2004/0207263 A1 | 10/2004 | Yanagida et al. | |
| 2005/0273282 A1 | 12/2005 | Mollenkopf | |
| 2006/0235586 A1 | 10/2006 | Waszkowski et al. | |
| 2013/0148748 A1 | 6/2013 | Suda | |
| 2014/0333262 A1 * | 11/2014 | Ochiai | B60L 11/1838 |
| | | | 320/109 |

FOREIGN PATENT DOCUMENTS

KR   20140033984 A   3/2014
WO   WO 2013083644 A1 *  6/2013  ............ H04B 3/548

* cited by examiner

*Primary Examiner* — Ryan Johnson
(74) *Attorney, Agent, or Firm* — Brian E. Kondas; Cheryl L. Greenly; Eugene E. Clair

(57) ABSTRACT

An electronic controller includes a first electrical input, receiving electrical power of a first voltage for powering the electronic controller, and a second electrical input, receiving an electrical power line communication signal at a second voltage. The second voltage is different than the first voltage. The power line communication signal is received from a second electronic controller that is powered by electrical power of the second voltage.

29 Claims, 2 Drawing Sheets

APPARATUS AND METHOD FOR POWER LINE COMMUNICATION ON A DUAL VOLTAGE VEHICLE

BACKGROUND

The present invention relates to power line communication (PLC). It finds particular application in conjunction with PLC used on heavy vehicles having a 24 volt electrical architecture and will be described with particular reference thereto. It will be appreciated, however, that the invention is also amenable to other applications.

PLC is used by industry in North America on heavy vehicles as a solution for trailer-tractor communication in articulated vehicles. An electronic control unit (ECU) on the trailer transmits a PLC signal on a 12 volt electrical power line supplied by the tractor. The signal is defined by SAE Recommended Practice J2497, and commands a trailer antilock braking system (ABS) malfunction indicator located in the tractor. More specifically, an ignition input pin of an ABS ECU on the tractor receives the PLC signal and controls the trailer ABS malfunction indicator by either illuminating or extinguishing the indicator. The ECU on the tractor typically includes two (2) electrical power pins: a battery input pin, which always receives 12 volt electrical power from a battery on the vehicle, and an ignition input pin, which receives 12 volt electrical power when the vehicle ignition is engaged. Electrical power received by the battery input pin powers one portion (e.g., a main portion) of the ECU, while power received by the ignition input pin is used to power another portion of the ECU (e.g., microelectronics such as a microcontroller in the ECU). PLC signals are also received by the ECU on the tractor via the ignition input pin.

The PLC signal is subject to attenuation or interference from, for example, powering the microelectronics on the ECU, and stringent testing is required to ensure acceptable performance. In that regard, PLC signals are typically only reliable on a power line of up to a voltage of ~18 volts. Therefore, vehicles requiring PLC have an electrical architecture using less than 18 volts (e.g., 12 volts in North America).

It is desirable to use PLC on towing vehicles (e.g., tractors and straight trucks) having a 24 volt electrical architecture that will tow trailers having an electrical architecture less than 18 volts (e.g., 12 volts).

The present invention provides a new and improved apparatus and method for PLC communication on a vehicle with a dual voltage architecture.

SUMMARY

In one embodiment, an electronic controller includes a first electrical input, receiving electrical power of a first voltage for powering the electronic controller, and a second electrical input, receiving an electrical power line communication signal at a second voltage. The second voltage is different than the first voltage.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
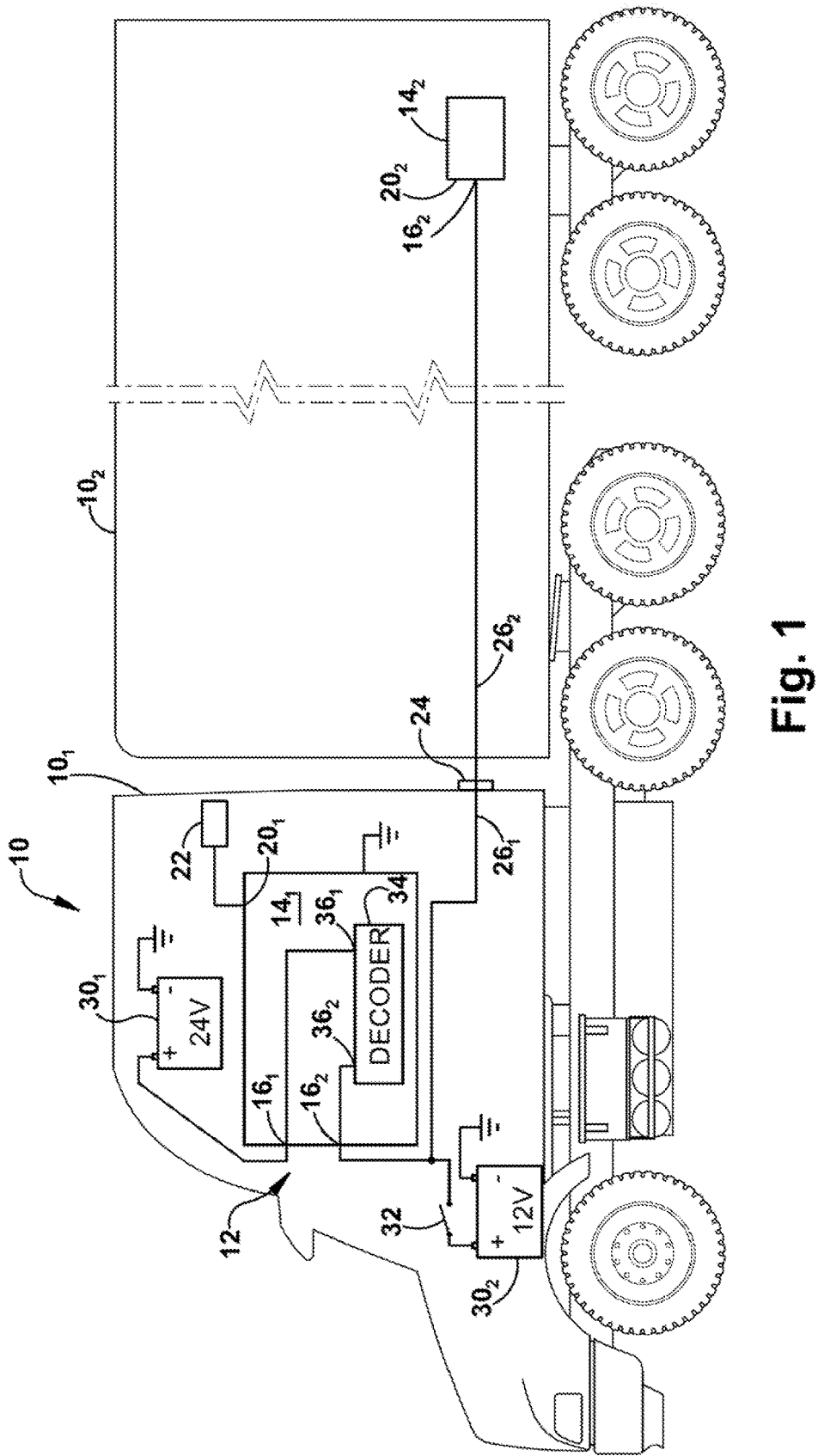
FIG. 1 illustrates a simplified component diagram of an exemplary vehicle including a communication system diagram in accordance with one embodiment of an apparatus illustrating principles of the present invention.

With reference to FIG. 1, a simplified component diagram of an exemplary vehicle 10 including a communication system 12 diagram is illustrated in accordance with one embodiment of the present invention.

In the illustrated embodiment, the vehicle 10 includes a plurality of portions $10_1$, $10_2$. For example, the first portion $10_1$ is a towing portion (e.g., a tractor), and the second portion $10_2$ is a towed portion (e.g., a trailer). It is contemplated in one embodiment that the first and second portions $10_{1,2}$ are portions of an articulated vehicle 10. In one embodiment, the towing portion $10_1$ of the vehicle 10 operates using a higher electrical architecture than the towed portion $10_2$ of the vehicle 10. For example, the towing portion $10_1$ of the vehicle 10 operates using an electrical architecture greater than or equal to 18 volts (e.g., 24 volts), and the towed portion $10_2$ of the vehicle 10 operates using an electrical architecture less than 18 volts (e.g., 12 volts). In another embodiment, the towing portion $10_1$ and the towed portion $10_2$ of the vehicle 10 operate using the same electrical architecture (e.g., 12 volts, 18 volts, or 24 volts).

The towing portion $10_1$ of the vehicle 10 includes a first electronic controller $14_1$ (e.g., an ECU). The towed portion $10_2$ of the vehicle 10 includes a second electronic controller $14_2$ (e.g., an ECU). In one embodiment the first ECU $14_1$ and the second ECU $14_2$ are ABS ECU's. However, it is to be understood that the ECU's $14_{1,2}$ may be associated with any electronic feature (e.g., automatic traction control (ATC), electronic stability control (ESC), a tire pressure monitor system (TPMS), a tire inflation system, a vehicle refrigeration system, a lift axle system, a chassis controller system, etc.) on the vehicle 10.

The first ECU $14_1$ on the towing portion $10_1$ includes a first electrical input $16_1$, a second electrical input $16_2$, and a first electrical output $20_1$.

The second ECU $14_2$ on the towed portion $10_2$ includes a third electrical input $16_3$ and a second electrical output $20_2$. In the illustrated embodiment, the third electrical input $16_3$ and the second electrical output $20_2$ of the second ECU $14_2$ are an electrically common input/output. However, other embodiments, in which the third electrical input $16_3$ and the second electrical output $20_2$ are electrically separate from each other are also contemplated.

The first electrical input $16_1$ is electrically connected to a first power source $30_1$, which produces electrical power of a first voltage. In one embodiment, the first voltage is the higher voltage (e.g., 24 volts) of the electrical architecture of the towing portion $10_1$. The second electrical input $16_2$, the third electrical input $16_3$, and the second electrical output $20_2$ are electrically connected to a second power source $30_2$ via a switch 32. The second power source $30_2$ produces electrical power of a second voltage (e.g., 12 volts), which is different (e.g., lower) than the first voltage. The third electrical input $16_3$ receives electrical power of the second voltage (e.g., 12 volts) for powering the second ECU $14_2$. In one embodiment, the second voltage is the lower voltage (e.g., 12 volts) of the electrical architecture of the towed portion $10_2$. In the illustrated embodiment, both the third electrical input $16_3$ and the second electrical output $20_2$ on the second ECU $14_2$ electrically communicate with the second electrical input $16_2$ on the first ECU $14_1$.

Microelectronics such as decoding electronics 34 (e.g., a decoder) included in the first ECU $14_1$ electrically communicate with the second electrical input $16_2$. In the illustrated embodiment, the decoding electronics 34 are powered at a first decoder port $36_1$ by the first voltage via the first electrical input $16_1$. Therefore, the second voltage supplied to the second electrical input $16_2$ from the second power source $30_2$ is not used for powering the decoding electronics 34 or any other components (e.g., microelectronics such as microcontrollers) on the first ECU $14_1$. A signal (e.g., a PLC signal) transmitted from the second ECU $14_2$ via the second electrical output $20_2$ is received by the decoding electronics 34 at a second decoder port $36_2$ via the second electrical input $16_2$. Therefore, in one embodiment, the second electrical input $16_2$ may be described as a signal input and the second electrical output $20_2$ may be described as a signal output. The first electrical input $16_1$ and third electrical input $16_3$ may be described as power inputs.

In the embodiment discussed herein, the first ECU $14_1$ is an ABS ECU on the towing portion $10_1$ of the vehicle 10. In that regard, the first ECU $14_1$ monitors a status of the towing portion $10_1$ ABS. Similarly, the second ECU $14_2$ is an ABS ECU on the towed portion $10_2$ of the vehicle 10. In that regard, the second ECU $14_2$ monitors a status of the towed portion $10_2$ ABS.

A vehicle indicator 22 is included on the vehicle 10. In one example, the vehicle indicator 22 is included on the towing portion $10_1$ of the vehicle 10 and electrically communicates with the first output $20_1$ of the first ECU $14_1$. The vehicle indicator 22 is used to convey a message to an operator of the vehicle 10 regarding a status of at least one of the first ECU $14_1$ and the second ECU $14_2$. For purposes of discussion, it is assumed the vehicle indicator 22 conveys messages to the operator of the vehicle 10 regarding the status of the second ECU $14_2$ on the towed portion $10_2$ of the vehicle 10. It is contemplated that the vehicle indicator 22 may be any type of indicator, including: a light that is turned on, off, or blinked; an audible sound that buzzes, rings, or speaks a message; a haptic feedback that vibrates a steering wheel of the vehicle 10 to notify the operator of the vehicle 10 the status of the second ECU $14_2$, etc. Since the first electrical output $20_1$ may transmit a message for controlling the vehicle indicator 22, the first electrical output $20_1$ may be described as a signal output. In another embodiment, the first electrical output $20_1$ may directly supply electrical power (e.g., via a direct hard-wired connection) for illuminating, extinguishing or blinking the vehicle indicator 22, in which case the first electrical output $20_1$ may be described as a power output.

An electrical coupler 24 electrically connects electrical lines $26_1$ (e.g., wires) on the first portion $10_1$ of the vehicle 10 with electrical lines $26_2$ (e.g., wires) on the second portion $10_2$ of the vehicle 10. In one embodiment, the electrical lines $26_{1,2}$ are connected to a vehicle communication bus (e.g., a controller area network (CAN) bus such as a J1939 standard vehicle communication bus). In this embodiment, each of the first electrical input $16_1$, the second electrical input $16_2$, and the first electrical output $20_1$ of the first ECU $14_1$, the third electrical input $16_3$ and the second electrical output $20_2$ of the second ECU $14_2$, and the vehicle indicator 22 electrically communicates with each other via the vehicle communication bus. As is commonly understood, various devices connected to the vehicle communication bus may communicate with each other via messages (e.g., messages formatted for the vehicle communication bus) transmitted via the bus according to, for example, the J1939 standard. As discussed in more detail below, the electrical coupler 24 electrically communicates electronic signals between the first and second ECU's $14_{1,2}$ via the electrical wires $26_{1,2}$.

Because the decoding electronics 34 are powered by the electrical power of the first (e.g., higher) voltage received from the first power source $30_1$ via the first electrical input $16_1$ (and not by the electrical power of the second (e.g., lower) voltage received from the second power source $30_2$), the PLC signal transmitted from the second electrical output $20_2$ to the second electrical input $16_2$ via the electrical lines $26_2$ is subject to less attenuation and interference than would normally result from powering microelectronics such as the decoding electronics 34 on the first ECU $14_1$. The reduced attenuation and interference results because the input impedance-to-ground for the PLC signal on the second electrical input $16_2$ is increased by removing the power electronics from the pin at that input. As an example, the input impedance can be increased by removing large filter capacitors associated with power supply circuitry. A higher input impedance permits the PLC signal to have a higher input amplitude, improving the PLC signal-to-noise ratio for the PLC decoding electronics 34.

The switch 32 is electrically between the second power source $30_2$ and both i) the second electrical input $16_2$ of the first ECU $14_1$ and ii) the third electrical input $16_3$ of the second ECU $14_2$. The switch 32 "closes" to make an electrical contact between the second power source $30_2$ and both i) the second electrical input $16_2$ and ii) the third electrical input $16_3$ when the ignition of the vehicle 10 is in an "ON" state (e.g., when the vehicle 10 ignition is turned on). Conversely, the switch 32 "opens" so that there is no electrical contact between the second power source $30_2$ and either i) the second electrical input $16_2$ or ii) the third electrical input $16_3$ when the ignition of the vehicle 10 is in an "OFF" state (e.g., when the vehicle 10 ignition is turned off). Therefore, the switch 32 may be referred to as an ignition switch.

In one embodiment, the function of the first ECU $14_1$ is active as long as the first electrical input $16_1$ receives electrical power from the first power source $30_1$. Although electrical power may be supplied to the second electrical input $16_2$ from the second power source $30_2$ when the switch 32 is in the closed position, the first ECU $14_1$ is not powered by electrical power received from the second power source $30_2$.

As discussed above, the second ECU $14_2$ communicates with the first ECU $14_1$ using PLC. For example, the status of the second ECU $14_2$ is communicated via a status message transmitted from the second electrical output $20_2$ of second ECU $14_2$ to the second electrical input $16_2$ of the first ECU $14_1$, via the vehicle communication bus, using PLC. Once the first ECU $14_1$ receives the status message via the second electrical input $16_2$, the first ECU $14_1$ evaluates the status message. The first ECU $14_1$ determines whether to transmit a message to the vehicle indicator 22, based on the PLC status message received from the second ECU $14_2$, via the first electrical output $20_1$. If the first ECU $14_1$ determines to transmit the message to the vehicle indicator 22, the message commands the vehicle indicator 22 based on the PLC status message received from the second ECU $14_2$ (e.g., the status of the second ECU $14_2$). In one embodiment, the message transmitted from the first ECU $14_1$ to the vehicle indicator 22 is transmitted via the vehicle communication bus. Alternatively, the first electrical output $20_1$ of the first ECU $14_1$ directly connects to the vehicle indicator 22, in which case the message transmitted from the first ECU $14_1$ to the vehicle indicator 22 is not transmitted via the vehicle communication bus. For example, if the first electrical output $20_1$ of the first ECU $14_1$ directly connects to the vehicle indicator 22, the message transmitted from the first electrical output $20_1$ may simply be electrical power at, for example, the first voltage for controlling the vehicle indicator 22.

Since the PLC message is transmitted between the second ECU $14_2$ and the second electrical input $16_2$ of the first ECU $14_1$, it is to be understood the PLC message is transmitted using the second, lower voltage (e.g., 12 volts).

As discussed above, the first ECU $14_1$ acts as a means for controlling an electronic feature (e.g., ABS, ATC, ESC) on a first portion of a dual voltage vehicle and receiving a PLC signal at the second of the voltages. Although the first ECU $14_1$ receives the PLC signal at the second of the voltages (e.g., 12 volts), the first ECU $14_1$ is powered by the first of the voltages (24 volts). The first ECU $14_1$ also acts as a means for reducing attenuation and/or interference of the PLC signal transmitted between the second output $20_2$ and the second input $16_2$ via the electrical lines $26_{1,2}$.

Figure 2:
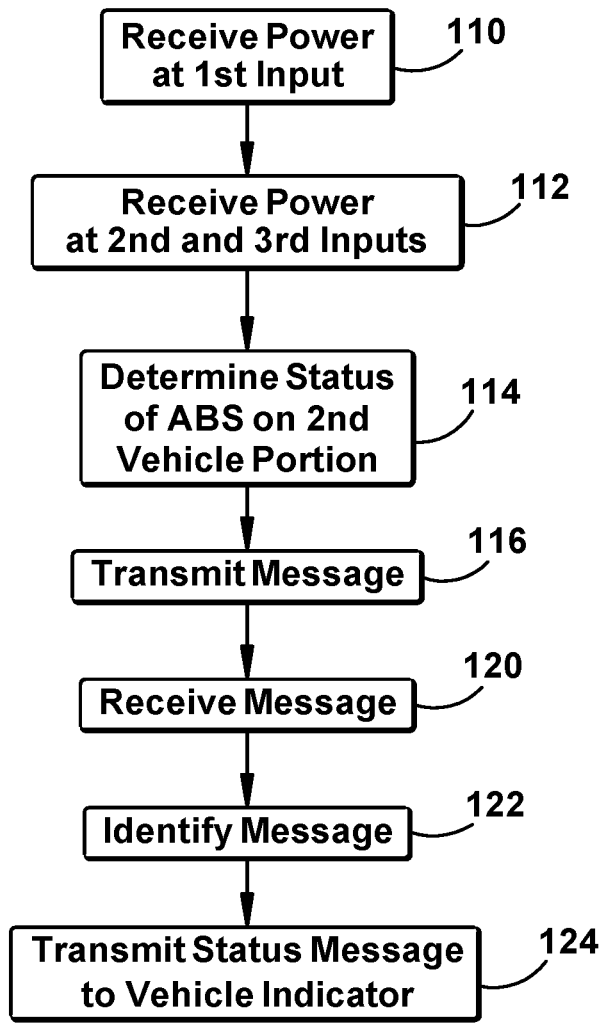
FIG. 2 is an exemplary methodology of power line communication on a dual voltage vehicle in accordance with one embodiment illustrating principles of the present invention.

With reference to FIG. 2, an exemplary methodology of the system shown in FIG. 1 for PLC communication on a dual voltage vehicle is illustrated. As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

With reference to FIGS. 1 and 2, power (e.g., a first power signal) at the first, higher voltage (e.g., 24 volts) is received at the first input $16_1$ (e.g., power input) of the first ECU $14_1$ in a step 110. Power is selectively received at the second, lower voltage (e.g., 12 volts) by the second input $16_2$ (e.g., signal input) of the first ECU $14_1$ and the third input $16_3$ (e.g., power input) of the second ECU $14_2$, based on the state of the ignition switch 32, in a step 112. As discussed above, although power at the lower voltage is received at the second input $16_2$ (e.g., signal input) of the first ECU $14_1$, the lower voltage power is not used for powering the first ECU $14_1$. The second ECU $14_2$ determines a status of the feature (e.g., ABS) on the towed portion $10_2$ of the vehicle 10 in a step 114. The second ECU $14_2$ selectively transmits a message signal from the second output $20_2$ (e.g., signal output), using PLC, at the second, lower voltage (e.g., 12 volts) based on the status of the feature (e.g., ABS) on the towed portion $10_2$ in a step 116. For example, if the status of the feature (e.g., ABS) on the towed portion $10_2$ is acceptable, the message may optionally be transmitted. On the other hand, if the status of the feature (e.g., ABS) on the towed portion $10_2$ is not acceptable, the message is always transmitted.

The PLC status message is received at the second input $16_2$ (e.g., signal input) of the first ECU $14_1$ in a step 120. The status message is identified in the PLC signal in a step 122. Based on the status message identified from the PLC signal, the first ECU $14_1$ selectively transmits a status message to the vehicle indicator 22 at the first, higher voltage (e.g., 24 volts) in a step 124.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. An electronic controller, comprising:
   a first electrical input receiving electrical power of a first voltage for powering the electronic controller;
   a second electrical input receiving an electrical power line communication signal at a second voltage that is different from the first voltage; and
   a switch between the second electrical input and a source providing the second voltage, the switch closing when an ignition of an associated vehicle is in an on position, and the switch opening when the ignition of the associated vehicle is in an off position.

2. The electronic controller as set forth in claim 1, wherein:
   electrical power at the second voltage is used for powering an associated second electronic controller while not being used for powering the electronic controller.

3. The electronic controller as set forth in claim 1, wherein:
   the first electrical input is a power input; and
   the second electrical input is a signal input.

4. The electronic controller as set forth in claim 1, wherein:
   an output signal from the electronic controller is based on the power line communication signal received at the second electrical input.

5. The electronic controller as set forth in claim 4, wherein:
   the power line communication signal received at the second electrical input indicates a status of an associated antilock braking system; and
   the output signal is based on the status of the associated antilock braking system.

6. The electronic controller as set forth in claim 5, wherein: the output signal commands an indicator of the associated vehicle.

7. The electronic controller as set forth in claim 1, wherein:
   the associated vehicle is an articulated vehicle;
   the electrical power of the first voltage is received from a first power source on a first portion of the articulated vehicle; and
   the power line communication signal of the second voltage is received from an associated second electronic controller on a second portion of the articulated vehicle.

8. The electronic controller as set forth in claim 7, wherein the power line communication signal is based on a status of the second electronic controller; and
   the electronic controller further including:
   an electrical output transmitting an output signal for controlling an associated vehicle indicator on the first portion of the articulated vehicle, the output signal being based on the status of the second electronic controller.

9. The electronic controller as set forth in claim 1, wherein:
the first voltage is higher than the second voltage.

10. The electronic controller as set forth in claim 9, wherein:
the first voltage is about 24 volts; and
the second voltage is about 12 volts.

11. A vehicle communication system, comprising:
a first electronic controller on a first portion of a vehicle, the first electronic controller including:
a first electrical power input receiving electrical power of a first voltage;
a second electrical signal input receiving a power line communication signal at a second voltage that is different from the first voltage; and
a first output; and
a switch between the second electrical signal input and a source providing the electrical power at the second voltage, the switch closing when an ignition of the vehicle is in an on position, and the switch opening when the ignition of the vehicle is in an off position;
a second electronic controller on a second portion of a vehicle, the second electronic controller including:
a third electrical power input receiving electrical power at the second voltage, the electrical power of the second voltage being used for powering the second electronic controller while not being used for powering the first electronic controller; and
a second electrical signal output transmitting the power line communication signal at the second voltage to the second electrical input.

12. The vehicle communication system as set forth in claim 11, wherein:
the first voltage is about 24 volts; and
the second voltage is about 12 volts.

13. The vehicle communication system as set forth in claim 11, wherein:
the power line communication signal is based on a status of the second electronic controller; and
the first output transmits a signal to a vehicle indicator based on the power line communication signal received at the second electrical signal input.

14. The vehicle communication system as set forth in claim 13, wherein:
the vehicle indicator is on the first portion of the vehicle; and
the vehicle indicator is controlled based on the signal transmitted from the first output; and
the vehicle indicator signals the status of the second electronic controller.

15. The vehicle communication system as set forth in claim 11, wherein:
the first electronic controller is an antilock brake system controller on the first portion of the vehicle; and
the second electronic controller is an antilock brake system controller on the second portion of the vehicle.

16. The vehicle communication system as set forth in claim 11, further including:
an electrical coupler between the first portion of the vehicle and the second portion of the vehicle, the electrical coupler electrically communicating signals between the first electronic controller and the second electronic controller.

17. The vehicle communication system as set forth in claim 16, wherein:
the first portion of the vehicle is a towing portion of the vehicle; and
the second portion of the vehicle is a towed portion of the vehicle that is towed by the towing portion.

18. A vehicle communication system, comprising:
means for controlling an electronic feature on a first portion of a dual voltage vehicle and receiving a power line communication signal at a second of the voltages;
a switch between the means and a source providing the second voltage, the switch closing when an ignition of an associated vehicle is in an on position, and the switch opening when the ignition of the associated vehicle is in an off position; and
an electronic controller on a second portion of the vehicle, the electronic controller including:
an electrical input receiving electrical power at the second voltage, the electrical power of the second voltage being used for powering the electronic controller on the second portion of the vehicle while not being used for powering the means for controlling the electronic feature on the first portion of the vehicle; and
an output transmitting the power line communication signal at the second voltage to the electrical input.

19. The vehicle communication system as set forth in claim 18, wherein:
the means for controlling receives electrical power at a first of the voltages.

20. The vehicle communication system as set forth in claim 18, further including:
a vehicle indicator;
wherein the power line communication signal is based on a status of the electronic controller on the second portion of the vehicle; and
wherein the means for controlling transmits an output signal for controlling the vehicle indicator based on the status of the electronic controller on the second portion of the vehicle.

21. A vehicle communication system, comprising:
a decoder on a first portion of a vehicle, the decoder being powered by electrical power at a first voltage and receiving a power line communication signal at a second voltage;
a switch between the decoder and a source providing the second voltage, the switch closing when an ignition of an associated vehicle is in an on position, and the switch opening when the ignition of the associated vehicle is in an off position; and
an electronic controller on a second portion of the vehicle, the electronic controller including an output transmitting the power line communication signal to the decoder,
wherein the decoder is arranged to reduce at least one of attenuation and interference of the power line communication signal received by the decoder.

22. The vehicle communication system as set forth in claim 21, wherein:
the electronic controller is powered by electrical power at the second voltage.

23. The vehicle communication system as set forth in claim 21, wherein:
the power line communication signal is based on a status of the electronic controller; and
the decoder further including:

an electrical output transmitting an output signal for controlling an associated vehicle indicator on the first portion of the vehicle, the output signal being based on the status of the electronic controller.

24. A method for communicating a power line communication signal on a vehicle, the method comprising:
receiving a power signal at a first voltage at a first electronic controller on a vehicle;
selectively receiving a power line communication signal at a second voltage at the first electronic controller;
receiving the second voltage at a switch provided between the first electronic controller and a power source;
closing the switch when an ignition of the vehicle is in an on position;
opening the switch when the ignition of the vehicle is in an off position;
identifying a message in the power line communication signal; and
based on the message in the power line communication signal, transmitting a status message.

25. The method for communicating a power line communication signal on a vehicle as set forth in claim 24, wherein the step of receiving the power line communication signal at the second voltage includes:
receiving the power line communication signal at the first electronic controller on a first portion of the vehicle from a second electronic controller on a second portion of the vehicle.

26. The method for communicating a power line communication signal on a vehicle as set forth in claim 24, further including:
determining a status of a second electronic controller from the power line communication signal.

27. The method for communicating a power line communication signal on a vehicle as set forth in claim 24, wherein:
the step of receiving the power signal includes:
receiving the power signal at the first voltage of 24 volts; and
the step of selectively receiving the power line communication signal at the second voltage includes:
receiving the power line communication signal at the second voltage of 12 volts.

28. The method for communicating a power line communication signal on a vehicle as set forth in claim 24, wherein the step of selectively receiving the power line communication signal at the second voltage includes:
selectively receiving the power line communication signal at the second voltage as a function of a state of an ignition of the vehicle.

29. The method for communicating a power line communication signal on a vehicle as set forth in claim 24, further including:
powering the first electronic controller with the power signal at the first voltage.

* * * * *